Patented Aug. 8, 1933

1,921,076

UNITED STATES PATENT OFFICE 1,921,076

PROCESS FOR THE MANUFACTURE OF ARYL-ALPHA-NAPHTHYLAMINES

John Frei, Wilmington, Del., assignor to E. I. du Pont de Nemours & Company, Wilmington, Del., a Corporation of Delaware No Drawing. Application May 12, 1927
Serial No. 190,971

20 Claims. (Cl. 260—128)

This invention relates to a process for the production of aromatic diarylamines. More particularly it relates to a process for producing aryl-alpha-naphthylamines by actively and continuously boiling primary aromatic amines with alpha-naphthylamines in the presence of a catalyst.

This case is a continuation in part of application serial No. 156,522, filed December 22, 1926 which has now matured into U. S. Patent No. 1,840,576.

The object of my invention is to provide a process for the manufacture of aryl-alpha-naphthylamines, whereby the temperature is raised in the course of the progress of the reaction without a reduction of the pressure. In U. S. Patent No. 1,840,576, referred to above, I have described a process for making aromatic diarylamines by heating aromatic amines or mixtures of such in the presence of a catalyst, to a suitable temperature under conditions that the contents of the reaction vessel are kept boiling under reflux during the whole operation.

In examples described in U. S. Patent No. 1,840,576 I carried out the reaction at a constant temperature, maintaining the continuous boiling by a steady reduction of pressure corresponding to the progress of the reaction.

I have now found, however, that in the case of aryl-alpha-naphthylamines it is not necessary and is even undesirable to carry out the reaction at a constant temperature and furthermore that the process may even be carried out in an open vessel at atmospheric pressure. I may, for instance, raise the temperature in the course of the progress of the reaction in order to maintain a steady boiling of the reaction and thus dispense with the gradual reduction in pressure heretofore found necessary. In my present invention the continuous boiling is as equally essential for the success of the reaction as in my previous process.

The process is disclosed in detail by the following examples. It is to be understood, however, that the reagents, proportions and conditions therein set forth are purely illustrative:

I. N-phenyl-alpha-naphthylamine

| | Part |
|---|---|
| Aniline | 1.00 |
| Alpha-naphthylamine | 1.00 |
| Sulphanilic acid | 0.02 |

This mixture is steadily boiled under atmospheric conditions, in an iron kettle, provided with a reflux condenser which serves to return the aniline and alpha-naphthylamine which may be vaporized. The vapors of ammonia may be permitted to escape from the top of the condenser. The boiling point of the mixture rises during the reaction until a boiling point in the reaction vessel of 230 to 235° C. is reached. After about 20 hours boiling the alpha-naphthylamine will have been used up and the reaction mass is then ready for fractional distillation under vacuum. A very good yield of N-phenyl-alpha-naphthylamine is obtained in this way.

II. N-p-tolyl-alpha-naphthylamine

| | Part |
|---|---|
| Alpha-naphthylamine | 1.00 |
| Para-toluidine | 1.00 |
| Sulphanilic acid | 0.02 |

This mixture is treated in the same way as mentioned in the preceding example. Because of the higher boiling point of paratoluidine, as compared with aniline, the boiling point of the reaction mixture is both at the beginning and at the end of the reaction somewhat higher than that given in the preceding example. A very satisfactory yield of the reaction product N-p-toluidine-alpha-naphthylamine is obtained by fractional distillation in the usual way.

In place of para-toluidine used in this reaction, ortho- and meta-toluidine can be used for producing orth- and meta-tolyl-alpha-naphthylamine, respectively.

My process is also applicable to the manufacture of diarylamines from various primary aromatic amines, as included in U. S. Patent No. 1,840,576, such as aniline, toluidines, xylidines, naphthylamines and phenetidine.

Also the materials suitable for use as catalysts may be any of those described in U. S. Patent No. 1,840,576, of which this case is a continuation in part. For instance, I may use as catalyst an acid or acid forming material which does not decompose at the temperature of the reaction and which does not enter into side reactions with other materials involved. I have found hydrogen chloride a very satisfactory catalyst, but I may use instead other halogens or hydrogen halides. Also, I may vary the quantity of the catalyst over a wide range, but I find that in the case of hydrogen chloride very satisfactory results are obtained with quantities between 1½% and 5% of the total charge.

As many apparently widely different embodiments of my present invention may be made without departing from the spirit thereof, it is to be understood that I do not limit myself to the foregoing examples, or descriptions, except as indicated in the following patent claims.

I claim:

1. The process of producing diaryl amines which comprises refluxing in an actively boiling condition at atmospheric pressure alpha-naphthylamine and a primary aromatic amine of the benzene series in the presence of an acidic condensation catalyst.

2. The process of producing diaryl amines which comprises refluxing in an actively boiling condition alpha-naphthylamine and a primary aromatic amine of the benzene series in the presence of an acidic condensation catalyst, and maintaining a temperature sufficient to insure steady boiling.

3. The process of producing diaryl amines which comprises refluxing in an actively boiling condition, under atmospheric pressure, alpha-naphthylamine and a primary aromatic amine of the benzene series in the presence of an acidic condensation catalyst and gradually increasing the temperature.

4. The process set forth in claim 1 in which the catalyst is an acid material that does not decompose at temperatures above about 235° C.

5. The process of producing di-aryl amines, which comprises refluxing in an actively boiling condition aniline and alpha-naphthylamine in the presence of an acidic condensation catalyst, and increasing the temperature during the progress of the reaction so as to insure steady boiling.

6. The process set forth in claim 1 in which the catalyst is sulphanilic acid.

7. The process of condensing aniline and alpha-naphthylamine to aryl-alpha-naphthylamines which comprises refluxing said materials in an actively boiling condition at atmospheric pressure in the presence of an acidic condensation catalyst, and gradually increasing the temperature until completion of the reaction.

8. The process of condensing aniline and alpha-naphthylamine to aryl-alpha-naphthylamines which comprises refluxing said materials in the presence of an acidic condensation catalyst, and maintaining an activity boiling condition at atmospheric pressure until completion of the reaction.

9. The process of condensing aniline and alpha-naphthylamine to aryl-alpha-naphthylamines which comprises refluxing said materials in an actively boiling condition under atmospheric pressure with amounts greater than 1% of an acidic condensation catalyst which does not decompose at the temperature of reaction, and gradually increasing the temperature.

10. The process of condensing aniline and alpha-naphthylamine to aryl-alpha-naphthylamines which comprises refluxing said materials in the presence of sulphanilic acid at atmospheric pressure, the proportions of sulphanilic acid being such as to enable it to function only as a catalyst, and maintaining an actively boiling condition until completion of the reaction.

11. The process of condensing aniline and alpha-naphthylamine to aryl-alpha-naphthylamines which comprises refluxing under atmospheric pressure said materials and 1% to 4% of sulphanilic acid, and increasing the temperature so as to maintain active boiling until completion of the reaction.

12. The process of producing diaryl amines, which comprises refluxing alpha-naphthylamine with an amine from the group consisting of aniline and its homologues at atmospheric pressure in the presence of an acidic condensation catalyst under such conditions that active boiling is maintained.

13. The process of producing aryl-alpha-naphthylamines which comprises refluxing alpha-naphthylamine with a toluidine in an actively boiling condition in the presence of an acid material that does not decompose at the temperature of the reaction, and increasing the temperature during the progress of the reaction, so as to maintain active boiling.

14. The process of producing aryl-alpha-naphthylamines which comprises refluxing para-toluidine and alpha-naphthylamine in an actively boiling condition in the presence of an acid material that does not decompose at the temperature of the reaction, and increasing the temperature during the progress of the reaction, so as to maintain active boiling.

15. The process of producing aryl-alpha-naphthylamines, which comprises refluxing para-phenetidine and alpha-naphthylamine in the presence of an acidic condensation catalyst and increasing the temperature during the progress of the reaction, so as to maintain active boiling.

16. The process of producing diaryl amines which comprises refluxing alpha-naphthylamine with a primary aromatic amine of the benzene series in the presence of a hydrogen halide under such conditions that active boiling is maintained.

17. The process of producing diaryl amines which comprises refluxing alpha-naphthylamine with a primary aromatic amine of the benzene series in the presence of hydrogen chloride under such conditions that active boiling is maintained.

18. The process of producing diaryl amines which comprises refluxing alpha-naphthylamine with an amine selected from the group consisting of aniline and its homologues at atmospheric pressure in the presence of a small amount of hydrogen chloride under such conditions that active boiling is maintained.

19. The process of claim 2 in which the primary aromatic amine of the benzene series contains a nuclear substituted alkyl group.

20. The process of claim 2 in which the primary aromatic amine of the benzene series contains a nuclear substituted alkoxy group.

JOHN FREI.